July 31, 1962     H. A. FREYHOLDT     3,046,639

METHOD OF MAKING HEAT EXCHANGER

Original Filed May 10, 1954

INVENTOR.
HELMUT A. FREYHOLDT
BY Elliott & Pastoriza
ATTORNEYS

United States Patent Office 3,046,639
Patented July 31, 1962

3,046,639
METHOD OF MAKING HEAT EXCHANGER
Helmut A. Freyholdt, 2385 Roscomare Road,
Los Angeles 24, Calif.
Original application May 10, 1954, Ser. No. 428,516. Divided and this application May 15, 1958, Ser. No. 735,528
14 Claims. (Cl. 29—157.3)

This invention generally relates to heat exchange apparatus and more particularly concerns an improved method of making a heat exchanger core.

This application is a division of applicant's copending application for Heat Exchanger and Method of Making Same filed May 10, 1954, and assigned Serial Number 428,516, now abandoned. Co-pending application Serial No. 754,106, filed August 8, 1958 and entitled Heat Exchanger Core Structure is also a division of application Serial No. 428,516, and a co-pending application entitled Machine for Winding Wire or the Like, directed to related subject matter was filed October 13, 1958, and assigned Serial No. 766,804.

Although numerous heat exchanger constructions have been proposed and many have found industry acceptance, the overall objective of finding an economical method of producing an efficient and rugged heat exchanger has not yet been satisfactorily realized. More specifically, the problem has been to produce a relatively inexpensive separation wall in the core structure, which will not only enable increased heat transfer efficiency, but which is inherently formed so as to withstand over an extended period of time the environmental conditions to which most heat exchangers are subjected.

An object of the present invention is, therefore, to provide a simplified method of making a heat exchanger core which may be embodied in an economical production process.

A further object of the present invention is to provide a method of making a heat exchanger core in accordance with the aforegoing object which will yield a core structure having increased heat transfer efficiency as well as decreased resistance to fluid flow.

Still another object of the present invention is to provide a method of forming a heat exchanger core construction which will yield a unitary, homogeneous wall structure for defining fluid passages throughout the core.

A still further object of the present invention is to provide a method of forming a heat exchanger core which will result in wall structures capable of withstanding considerable pressure differentials, temperature variations, and vibrational forces.

These and other objects and advantages of the present invention are generally accomplished by a method including the steps of arranging sealing material in a gridlike pattern, thereafter arranging heat conductive members in the form of a wire in a grid-like pattern across the sealing material, and finally repeating these two steps in alternation to make a stack of grids defining a heat exchanger core of wall structures formed by the sealing material and heat transfer elements formed by the stack of wire grids. The alternate repetition of the first two steps is performed such that subsequent sealing material grids are in alignment.

A better understanding of the present invention will be had by reference to the drawings illustrating in one form the method of the present invention and in which.

In the drawings the same numerals have been used in different figures thereof to designate similar parts and elements.

Figure 1:
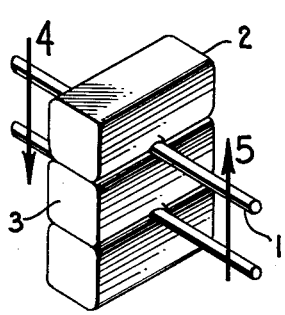
FIGURE 1 is an isometric view of a heat transfer element formed in accordance with the method of the present invention.
Figure 2:
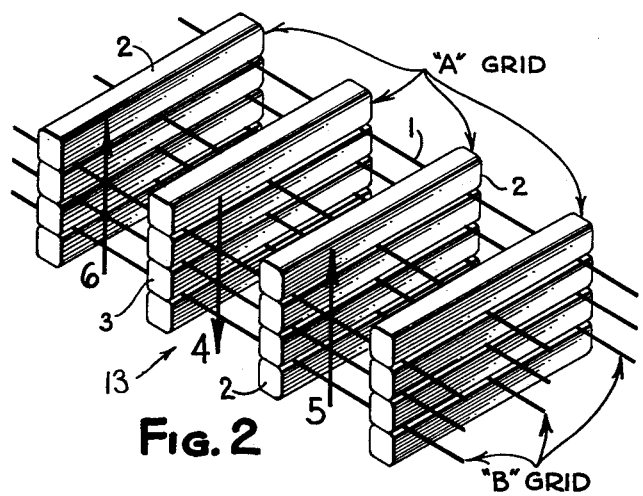
FIGURE 2 is an isometric view of a heat exchanger core formed in accordance with the method of the present invention; and, FIGURE 3 is a plan view illustrating a preferred means for accomplishing the method of the present invention in forming a heat exchanger core structure.

Referring now to the drawings, the purpose of the present invention is to provide a method for forming the heat transfer element and core structure shown respectively in FIGURES 1 and 2. The heat transfer element and core, although the subject matter of applicant's above referred to co-pending application, are briefly shown and described herein in order to obtain a clearer and fuller understanding of the importance of the method of the present invention.

The heat transfer element consists of two heat conducting members in the form of wires 1 extending across and between three members of sealing material 2. As more clearly seen in FIGURE 2, the members of sealing material 2 are in line with each other and sealed together to form a separation wall 3 across and between wires 1, which extend into the fluid passages 4 and 5 defined by opposing walls 3.

Figure 3:
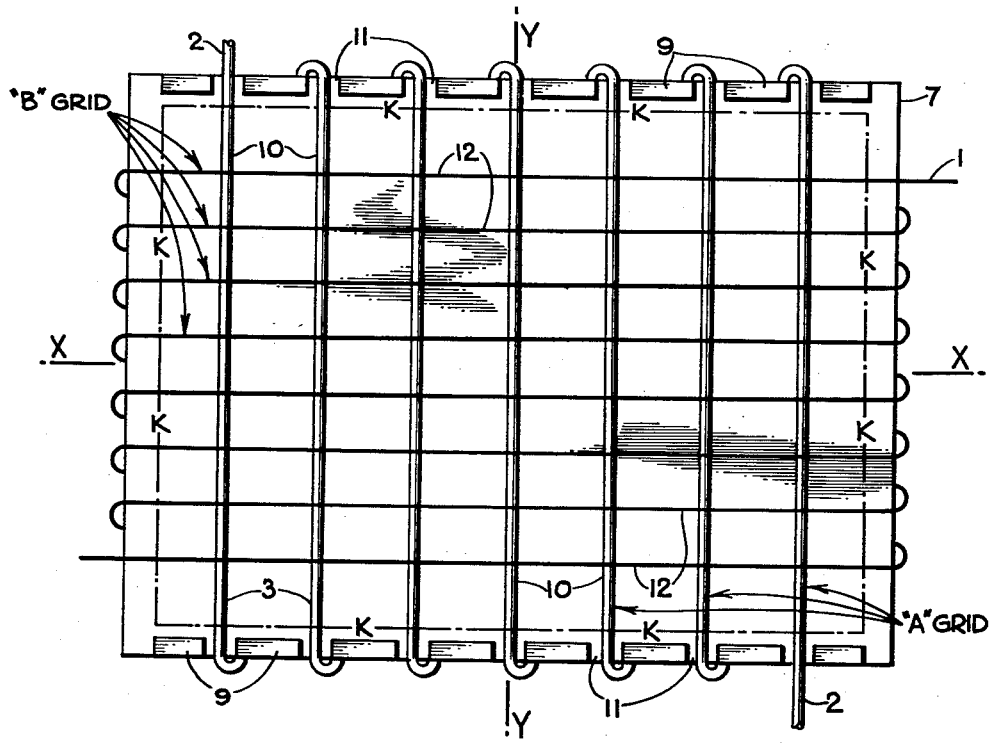

In accordance with the present invention, a preferred method of forming the heat transfer element and core as shown in FIGURES 1 and 2, respectively, is illustrated by FIGURE 3. Thus, a supporting member in the form of a plate 7 is provided with a multitude to teeth 9, which are fastened at right angles thereon and which stand along two edges and on both sides thereof. A first coil consisting of sealing material 2 may be formed by coiling this sealing material around plate 7 either with the plate 7 stationary or revolving about axis *x—x*. On each side of the plate 7, individual windings 10 of this first coil fall into slots 11 between teeth 9 and become arranged side by side in a grid-like pattern, referred to as grid "A." A second coil consisting of heat conductive members in the form of wire 1 may be formed by coiling this wire around plate 7 either with the plate stationary or revolving about axis *y—y*. Wire 1 comes to rest upon sealing material 2 which crosses at substantially right angles. On each side of plate 7, individual windings 12 become arranged in an aligned grid-like pattern, referred to as grid "B." While FIGURE 3 merely shows only the first "A" and "B" grids coiled on the plate 7, the production of "A" and "B" grids may be continued by coiling sealing material 2 and wire 1 upon each other in alternating aligned layers until the stack of alternating "A" and "B" grids built up on each side of plate 7 holds a desired amount of heat transfer surface in the form of wire 1. Teeth 9 and slots 11 permit the in-line stacking of consecutive "A" grids thereby forming separation walls 3 across wire 1. Friction, caused by the tension of the windings 12 with the other edges of the plate or supporting member 7 holds the lateral spacing of the side-by-side windings.

In instances in which the sealing material 2 is of a composition which requires heat treatment to develop sealing and/or rigidizing characteristics, it is thereafter necessary to continue with the additional step of, for example, placing the plate 7 in an oven after the coiling procedure is completed. In a preferred construction, the sealing material comprises a thermosetting plastic or resin which is applied in a semi-liquid state over wire carrier members. The plastic, as thus employed during the winding steps, forms a continuous homogeneous separation wall. Thereafter the plastic is rigidized by heat treatment.

In another preferred arrangement sealing material 2 consists of a .02 inch diameter cable, upon which a coating of thermosetting resin is extruded prior to the coiling process. This cable not only serves as a carrier to permit the coiling of the structurally weak, uncured resin, but it also acts as a spacer between stacked "B" grids when the resin softens during the required heat treatment. After the completed heat treatment, this cable embedded in the cured resin constitutes a structural reinforcing of separation walls 3 which results in a strengthening of core 13. During the coiling process as well as during the heat treatment, wire 1 cuts into the soft resin coating and touches the .02 inch cable, which is part of sealing material 2. This results in uniform .02 inch spacing of stacked "B" grids and it assures perfect embedding of wire 1 in sealing material 2, with resulting tightness of separation walls 3.

After the completion of heat treatment, which may have resulted in the vulcanization of rubber, melting of brazing material, or in the curing of plastic as heretofore described (according to the sealing material 2 employed), cores 13 (as illustratively shown, for example in FIGURE 2) may thereafter be removed from plate 7 by cutting along line $k$—$k$, whereby two separate cores are produced, one from each side of plate 7. These two cores may thereafter be sub-divided into any number of cores of any size desired.

It is further apparent that in the event the core structures are not self supporting, plate 7 itself may be embodied in the final heat exchanger apparatus formed. In such a design, plate 7 must necessarily be provided with required openings of pre-determined spacing for co-operation with fluid passages being formed between the wall structures 3. In addition, it is to be noted that the core structure, if it is removed from the plate 7 as by severing it along the lines $k$—$k$, may thereafter be formed into any shape desired by conventional machining operations. With the latter preferred method, plate 7 may thereafter be used for the manufacture of additional heat exchanger cores.

While one means of accomplishing the method of the present invention has been shown and described for illustrative purposes other suitable methods may be used to produce core 13. For example separate members of sealing material 2 may be arranged individually side-by-side to form a grid-like pattern, and separate members of wire 1 may be arranged individually side-by-side to form a grid-like pattern over and across the grid of sealing material. This method may be desirable when sealing material 2 or wire 1 attain the thickness of rods difficult to coil around a plate. It will, therefore, be obvious to those skilled in the art that various changes and modifications may be made without departing from the scope and spirit of the invention as set forth hereafter in the following claims.

What is claimed is:

1. In a method of making a heat exchanger core, the steps of: coiling sealing material at a given location in one direction around a supporting member; coiling heat conductive members in another direction in spaced, side by side windings around said supporting member and across said sealing material to define a layer of heat conductive members; repeating the aforegoing steps in alternation on the same supporting member and bringing successive coils of sealing material into stacked alignment with preceding coils to thereby provide a fluid-tight wall structure formed of overlying lengths of sealing material at said given location around said supporting member and maintaining lateral spacing of said heat conductive members in each layer and between successive layers while causing the members to be embedded and sealed in the wall, said wall structure thereby having spaced heat conductive members extending transversely therethrough in a plurality of layers.

2. In a method of making a heat exchanger core, the steps according to claim 1, and the additional step of removing said wall structure and heat conductive members from said supporting member by cutting said wall structure and said heat conductive members where they pass around the edge of said supporting member thereby to form two substantially identical, integral, one-piece monolithic heat exchanger cores.

3. In a method of making a heat exchanger core, the steps of claim 1, and the additional step of sealing and bonding successively adjacent lengths of said sealing material against each other with said heat conductive members embedded therein, whereby the coiled sealing material is homogeneously and stably held together and to the alternately interposed transverse heat conductive members throughout the entire wall structure to form a unitary wall structure.

4. In a method of making a heat exchanger core, the steps of claim 2, and the additional step of shaping said core.

5. In a method of making a heat exchanger core, the steps of: coiling sealing material and carrier members in one direction at a given location around a supporting member; coiling heat conductive members in another direction in spaced, side by side windings around said supporting member and across said sealing material to define a layer of heat conductive members, repeating the aforegoing steps in alternation on the same supporting member and bringing successive coils of sealing material into stacked alignment with preceding coils to thereby provide a fluid-tight wall structure formed of overlying lengths of sealing material at said given location around said supporting member and maintaining lateral spacing of said heat conductive members in each layer and between successive layers while causing the members to be embedded and sealed in the wall, said wall structure thereby having a plurality of spaced layers of heat conductive members, each layer having a plurality of spaced heat conductive members extending transversely through said wall structure, whereby the sealing material is stably sealed together and to the alternately interposed transverse heat conductive members and to the carrier members throughout the entire wall structure, and whereby the wall is strengthened by the carrier members.

6. In a method of making a heat exchanger core, the steps of: coating sealing material on carrier members, coiling the sealing material and carrier members in one direction at a given location around a supporting member; coiling heat conductive members in another direction in spaced, side by side windings around said supporting member and across said sealing material to define a layer of heat conductive members; repeating the aforegoing steps in alternation on the same supporting member and bringing successive coils of sealing material into stacked alignment with preceding coils to thereby provide a fluid-tight wall structure formed of overlying lengths of sealing material at said given location around said supporting member, and maintaining lateral spacing of said heat conductive members in each layer and between successive layers while causing the members to be embedded and sealed in the wall, said wall structure thereby having a plurality of spaced layers of heat conductive members, each layer having a plurality of spaced heat conductive members extending transversely through the wall structure, whereby the sealing material is stably sealed together and to the alternately interposed transverse heat conductive members and to the carrier members throughout the entire wall structure and whereby the wall is strengthened by the carrier members.

7. In a method of making a heat exchanger core, the steps according to claim 5, including forming said supporting member with rectangularly arranged edges and coiling said sealing material and carrier members about one pair of opposed edges and said heat conductive members about the other pair.

8. In a method of making a heat exchanger core, the steps according to claim 7, including the step of forming guide means on at least one pair of opposed edges of said supporting member to position the coils.

9. In a method of making a heat exchanger core, the steps of: coiling a plurality of spaced sealing material windings in one direction at a plurality of given spaced locations around a supporting member; coiling a plurality of spaced side by side windings of heat conductive material in another direction around said supporting member and across said sealing material windings to define a layer of heat conductive members; repeating the aforegoing steps in alternation on the same supporting member and bringing the windings of successive coils of sealing material into stacked alignment with the windings of preceding coils to thereby provide a plurality of aligned spaced, fluid-tight wall structures of sealing material at said given spaced locations around said supporting member, and maintaining lateral spacing of said heat conductive members in each layer and between successive layers while causing the members to be embedded and sealed in the wall, said wall structures having spaced heat conductive members extending transversely therethrough in a plurality of layers.

10. In a method of making a heat exchanger core, the steps according to claim 9, and the further step of treating said wall structures so as to respectively form a rigidized and sealed relationship therethrough, whereby the coiled sealing material is stably sealed together and to the alternately interposed transverse heat conductive members throughout the height of each said wall structure, and removing the supporting member by cutting said wall structure and said heat conductive members where they pass around the edge of said supporting member, thereby to form two substantially identical integral, one-piece monolithic heat exchanger cores.

11. In a method of making a core for use in a heat exchanger, the steps of: arranging lengths of sealing material is given lateral spacing in a grid-like pattern; arranging length of heat conductive members in a given laterial spacing in a grid-like pattern across said grid-like pattern of lengths of sealing material; and, repeating said steps in alternation with lengths of sealing material of subsequent grid-like patterns stacked on the respective lengths of sealing material of the previous grid-like patterns in overlying relationship while maintaining the lateral spacing of the heat conductive members in each of the grid-like patterns and the lateral spacing between the heat conductive members of successive patterns in layers to define passages for a fluid among the heat conductive members, causing successively adjacent lengths of sealing material to merge and unite to form fluid-tight walls through which layers of heat conductive members pass in sealing relationship, said walls at least partially defining said passages for the flow of a fluid among the heat conductive members in directions transverse with respect thereto.

12. In a method of making a core for use in a heat exchanger, the steps of: arranging sealing material and carrier members in a grid-like pattern, thereby to produce a first grid; arranging heat conductive members in a grid-like pattern across said first grid, thereby to produce a second grid over said first grid; continuing the production of first and second grids and stacking said first and second grids in alternating layers thereby to produce a stack of alternating first and second grids; aligning the members of subsequent first grids with the members of preceding first grids when first grids are being produced and stacked, thereby to produce separation walls and fluid passages across the stacked second grids; holding said heat conductive members in laterally spaced relationship along both axes of the plane of said wall, thereby populating the passages with laterally spaced heat conductive members extending transversely therethrough; and sealing the stacked and aligned members of said first grids against each other and sealing the heat conductive members therein, thereby to produce solid monolithic walls and a unitary core structure.

13. In a method of making a heat exchanger core, the steps according to claim 12, including arranging said sealing material in a grid-like pattern by first applying the sealing material to the carrier members to embed the carrier members therein.

14. In a method of making a heat exchanger core, the step of claim 9 including the step of forming openings in the supporting member to place parts of the structure on one side of the supporting member in communication with parts of the structure on the opposite side, whereby the core structure has passages on opposite sides of the supporting member which are in communication with each other and the supporting member is retained as part of the heat exchanger core.

References Cited in the file of this patent

UNITED STATES PATENTS

| | | |
|---|---|---|
| 1,734,274 | Schubart | Nov. 5, 1929 |
| 1,739,246 | Majce | Dec. 10, 1929 |
| 2,434,532 | Wurtzburger | Jan. 13, 1948 |
| 2,547,632 | Ewing | Apr. 3, 1951 |
| 2,701,130 | Boestad | Feb. 1, 1955 |

FOREIGN PATENTS

| | | |
|---|---|---|
| 479,839 | Great Britain | Feb. 8, 1938 |
| 527,135 | Belgium | Mar. 31, 1954 |
| 265,954 | Switzerland | Dec. 31, 1949 |